(12) United States Patent
Sato et al.

(10) Patent No.: US 11,480,820 B2
(45) Date of Patent: Oct. 25, 2022

(54) DISPLAY DEVICE

(71) Applicant: Alps Alpine Co., LTD, Tokyo (JP)

(72) Inventors: Katsunori Sato, Fukushima (JP);
Hiroyuki Banba, Fukushima (JP)

(73) Assignee: ALPS ALPINE CO., LTD., Tokyo (JP)

(*) Notice: Subject to any disclaimer, the term of this patent is extended or adjusted under 35 U.S.C. 154(b) by 0 days.

(21) Appl. No.: 17/570,817

(22) Filed: Jan. 7, 2022

(65) Prior Publication Data

US 2022/0221751 A1  Jul. 14, 2022

(30) Foreign Application Priority Data

Jan. 8, 2021  (JP) .............................. JP2021-001851

(51) Int. Cl.
*G02F 1/1333* (2006.01)
(52) U.S. Cl.
CPC .... *G02F 1/133317* (2021.01); *G02F 1/13338* (2013.01); *G02F 1/133331* (2021.01)
(58) Field of Classification Search
CPC ......... G02F 1/133317; G02F 1/133331; G02F 1/13338
USPC .......................................................... 349/122
See application file for complete search history.

(56) References Cited

U.S. PATENT DOCUMENTS

| 10,649,277 | B1* | 5/2020 | Sugiyama | .......... G02F 1/133608 |
| 2015/0103053 | A1* | 4/2015 | Lin | ........................ G06F 3/0412 |
| | | | | 345/175 |
| 2019/0137682 | A1 | 5/2019 | Ohki et al. | |

FOREIGN PATENT DOCUMENTS

| EP | 2 568 465 A1 | 3/2013 |
| JP | 2019-086761 | 6/2019 |
| JP | 2020-071319 | 5/2020 |
| WO | WO 2014/083692 A1 | 6/2014 |

OTHER PUBLICATIONS

Extended European search report from corresponding European Patent Application No. 21217505.3, dated May 10, 2022, 23 pp.

* cited by examiner

*Primary Examiner* — Charles S Chang
(74) *Attorney, Agent, or Firm* — Crowell & Moring LLP

(57) ABSTRACT

A display device improves ESD resistance while using a plurality of adhesive double-sided tapes for fixing a display. After an OGS and a liquid crystal display are bonded to each other to be integrated, an outer edge portion of the OGS is bonded and fixed to a frame housing a backlight unit by four adhesive double-sided tapes. The four adhesive double-sided tapes are arranged to substantially surround a central region with a slight gap between adjacent ones of the adhesive double-sided tapes. An end portion of each of the adhesive double-sided tapes is set to have a shape such that a narrow path is bent, rather than being straight, the narrow path being a space surrounded by end surfaces of the two adhesive double-sided tapes between the frame and the OGS and extending narrowly.

20 Claims, 3 Drawing Sheets

DISPLAY DEVICE

RELATED APPLICATION

The present application claims priority to Japanese Patent Application Number 2021-001851, filed Jan. 8, 2021, the entirety of which is hereby incorporated by reference.

BACKGROUND

1. Field of the Invention

The present invention relates to a technology for a countermeasure against electro-static discharge (ESD) in a display device such as a liquid crystal display device.

2. Description of the Related Art

As a liquid crystal display device, as illustrated in FIG. 3A, there is known a liquid crystal display device having a structure in which a cover glass 101 and a liquid crystal display (liquid crystal cell) 102 are bonded to each other to be integrated, and then an outer edge portion of the cover glass 101 is bonded and fixed to a frame 104 housing a backlight unit 103 by an insulating adhesive double-sided tape 105 (e.g., JP 2020-71319 A and JP 2019-86761 A).

In the liquid crystal display device having the structure illustrated in FIG. 3A, when four adhesive double-sided tapes 105 provided for the respective sides of the cover glass 101 as illustrated in FIG. 3B are used as the adhesive double-sided tape 105, a slight gap is inevitably generated between the adhesive double-sided tapes 105 as illustrated in FIG. 3C. Through this gap, an arc resulting from electrostatic discharge (ESD) may affect the inside, causing circuit breakdown or malfunction.

If one adhesive double-sided tape 105 surrounding an outer edge of the cover glass 101 is used for the bonding and fixing of the cover glass 101, such a problem does not occur. In this case however, a large-scale special adhesive double-sided tape 105 is required, leading to an increase in cost.

An object of the present disclosure is to achieve sufficient ESD resistance while using a plurality of adhesive double-sided tapes to fix a display to a frame.

SUMMARY

According to the present disclosure, a display device includes a display; a glass bonded to a front surface of the display such that an outer edge portion of a rear surface thereof is not covered by the display; a frame; and a plurality of adhesive double-sided tapes configured to bond the outer edge portion of the rear surface of the glass to the frame, wherein the plurality of adhesive double-sided tapes include a first adhesive double-sided tape extending along a first side of the glass, and a second adhesive double-sided tape extending along a second side adjacent to the first side of the glass.

Here, an end portion of the first adhesive double-sided tape on the second side and an end portion of the second adhesive double-sided tape on the first side are adjacent to each other with a gap therebetween, and the gap is bent at three or more locations while extending narrowly as viewed in a front-rear direction.

Alternatively, an end portion of the first adhesive double-sided tape on the second side and an end portion of the second adhesive double-sided tape on the first side are adjacent to each other with a gap therebetween, and the gap has sections that advance along the gap in directions opposite to one another from one end to the other end of the gap while extending narrowly as viewed in a front-rear direction.

Here, in the above-described display device, a region occupied by the gap is preferably a region within a range where a part extending along the first side in the outer edge portion overlaps a part extending along the second side in the outer edge portion as viewed in the front-rear direction.

In addition, in the above-described display device, the glass may be a one-glass solution (OGS) having a function as a touch panel.

In addition, in the above-described display device, the display may be a liquid crystal display, and the display device may include a backlight unit fixed to the frame at a position behind the display.

According to the display device as described above, a creepage distance of a narrow path from an outer end thereof, which is exposed to the outside of the gap between the adhesive double-sided tapes, to an inner end thereof, which leads to an inside space of the display device where a conductor is provided, can be sufficiently larger than that in a case where the narrow path is straight, as a result improving ESD resistance to external electrostatic discharge.

As described above, according to the present disclosure, sufficient ESD resistance can be achieved while using the plurality of adhesive double-sided tapes to fix the display to the frame.

BRIEF DESCRIPTION OF THE DRAWINGS

FIGS. 2A to 2C are diagrams illustrating other examples of the configuration of the liquid crystal display device according to the embodiment of the present invention.

DETAILED DESCRIPTION

Hereinafter, an embodiment of the present invention will be described.

Figure 1A:
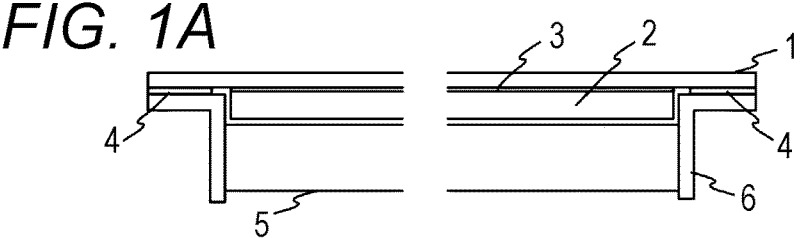
FIGS. 1A to 1D are diagrams illustrating a configuration of a liquid crystal display device according to an embodiment of the present invention.

FIG. 1A illustrates a structure of a liquid crystal display device according to the present embodiment in a cross section perpendicular to a display surface.

As illustrated, the liquid crystal display device includes a one-glass solution (OGS) 1 having functions as a cover glass and a touch panel, a liquid crystal display (liquid crystal cell) 2, and an optical adhesive sheet (optical clear adhesive (OCA)) 3, an adhesive double-sided tape 4, a backlight unit 5, and a frame 6 housing the backlight unit 5.

When the upper side is considered front and the lower side is considered rear in FIG. 1A, a front surface of the liquid crystal display 2 is bonded to a central portion of a rear surface of the OGS 1 by the optical adhesive sheet 3.

As viewed in a front-rear direction, the OGS 1 is larger than the liquid crystal display 2 and has an outer edge portion that does not overlap with the liquid crystal display 2.

A rear surface of the outer edge portion of the OGS 1 is bonded and fixed to a front-end flange of the frame 6 by the adhesive double-sided tape 4 such that the liquid crystal display 2 is disposed to be accommodated in the frame 6 in front of the backlight unit 5.

Figure 1B:
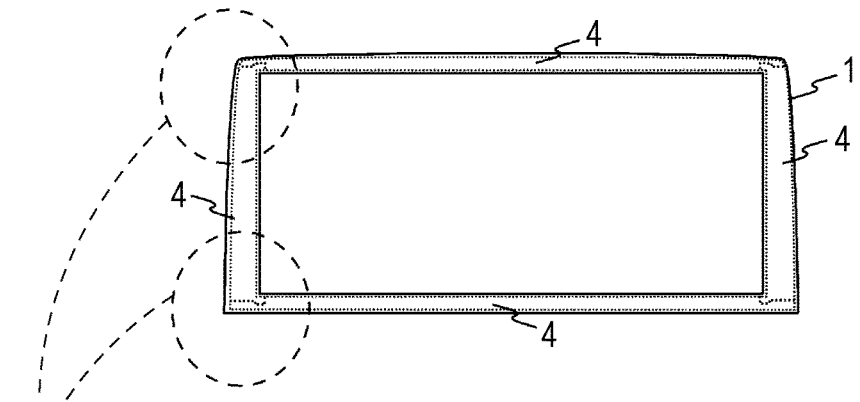

Here, as illustrated in FIG. 1B illustrating the arrangement of the liquid crystal display device as viewed from the front, four adhesive double-sided tapes 4 are used and provided in the outer edge portion of the OGS 1 to substantially surround a central region, the four adhesive double-sided tapes 4 including an adhesive double-sided tape 4 extending horizontally near an upper side of the OGS 1 along the upper side, an adhesive double-sided tape 4 extending horizontally near a lower side of the OGS 1 along the lower side, an adhesive double-sided tape 4 extending vertically near a left side of the OGS 1 along the left side, and an adhesive double-sided tape 4 extending vertically near a right side of the OGS 1 along the right side.

Figure 1C:
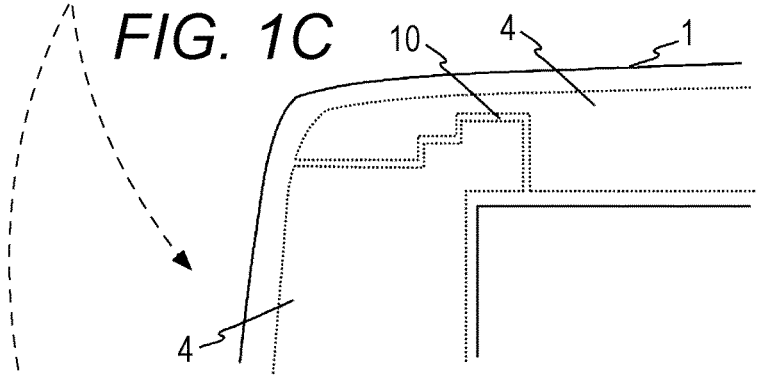
Figure 1D:
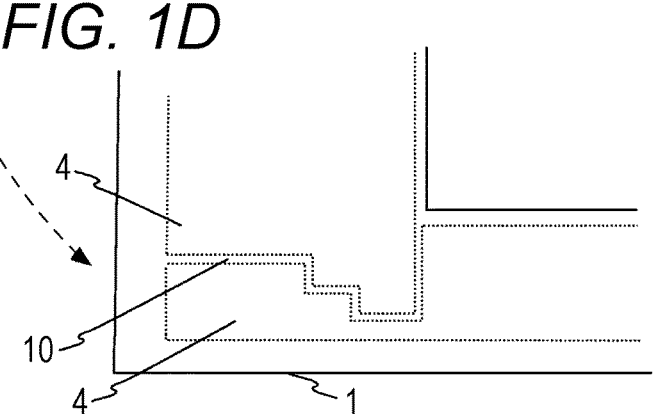

Next, the vicinity of an upper left corner of the OGS1 is illustrated in an enlarged manner in FIG. 1C, and the vicinity of a lower left corner of the OGS1 is illustrated in an enlarged manner in FIG. 1D. Note that the vicinity of an upper right corner of the OGS1 is what is horizontally inverted of FIG. 1C, and the vicinity of a lower right corner of the OGS1 is what is horizontally inverted of FIG. 1D.

As illustrated, the two adhesive double-sided tapes extending along the adjacent sides, respectively, are arranged with a slight gap of about a few tenths of a millimeter therebetween without contacting each other. This gap forms a narrow path 10, which is a space surrounded by end surfaces of the two adhesive double-sided tapes 4 between the frame 6 and the OGS 1 and extending narrowly.

In addition, an end portion of each of the adhesive double-sided tapes 4 is set to have a shape such that the narrow path 10 is bent, rather than being straight. More specifically, the shape of the end portion of each of the adhesive double-sided tapes 4 is set such that three or more bends appear in the narrow path 10 or there are sections that advance in directions opposite to one another from one end to the other end of the narrow path 10.

By setting the shape of the end portion of the adhesive double-sided tape 4 such that the narrow path 10 is bent as described above, a creepage distance of the narrow path 10 from an outer end thereof, which is exposed to the outside of the liquid crystal display device, to an inner end thereof, which leads to an inside space of the liquid crystal display device where a conductor is provided, is larger than that in a case where the narrow path 10 is straight, and as a result, ESD resistance to external electrostatic discharge is improved.

Figure 2A:
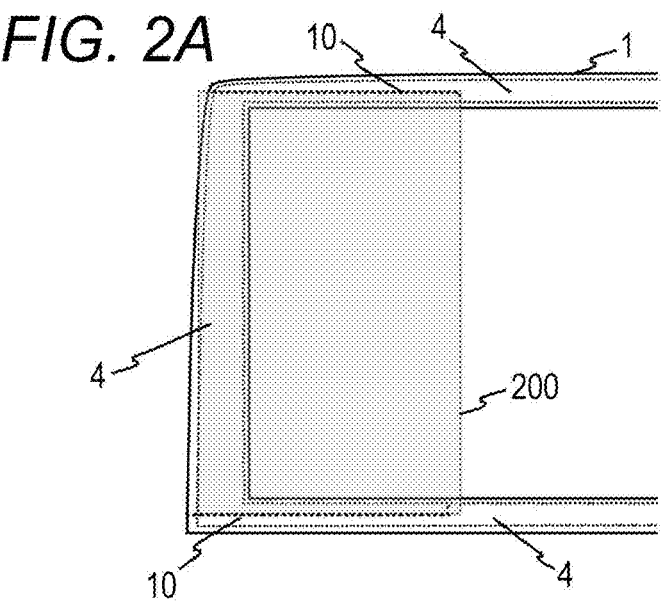

Further, since the creepage distance is increased by bending the narrow path 10, no large-scale adhesive double-sided tape 4 is required, thereby suppressing an increase in cost, for example, when compared with a case where the creepage distance is increased by setting the shape of the end portion of the adhesive double-sided tape 4 such that a long straight section appears in the narrow path 10. That is, for example, in a case where the narrow path 10 is provided such that a long straight section appears as illustrated in FIG. 2A, it is necessary to prepare an adhesive double-sided tape 4 on the left side by, for example, processing a large-scale adhesive double-sided sheet having a size indicated by 200 in FIG. 2A. However, according to the present embodiment, each adhesive double-sided tape 4 can be manufactured without using such a large-scale adhesive double-sided sheet.

An embodiment of the present invention has been described above.

In the above-described embodiment, the shape of the end portion of the narrow path 10 or the adhesive double-sided tape 4 illustrated in FIGS. 1A to 1D is an example. Note that any bent shape may be used as the shape of the narrow path 10, for example, a shape illustrated in FIG. 2B1, in which the narrow path 10 advances in a repeatedly reciprocating manner from one end to the other end thereof, a shape illustrated in FIG. 2B2, in which the narrow path 10 advances in a spiral manner from one end to the other end thereof, or the like.

Figure 2C:
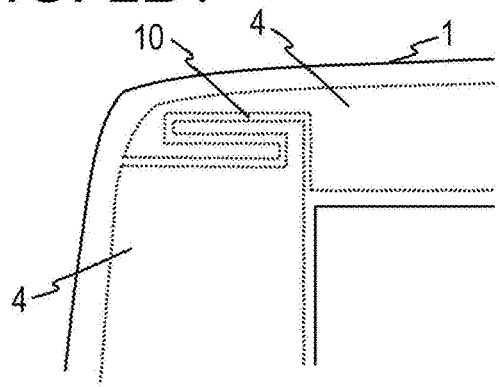
Figure 2C:
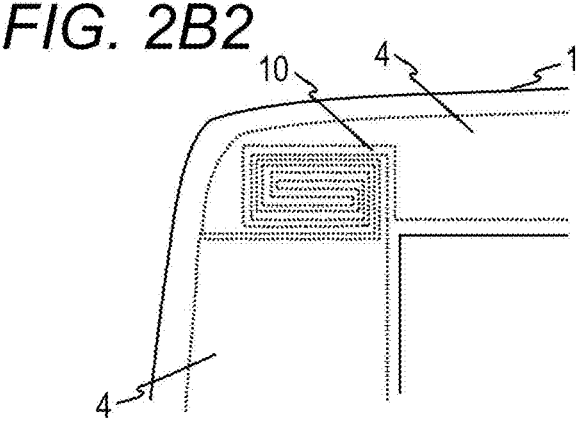
Figure 2C:
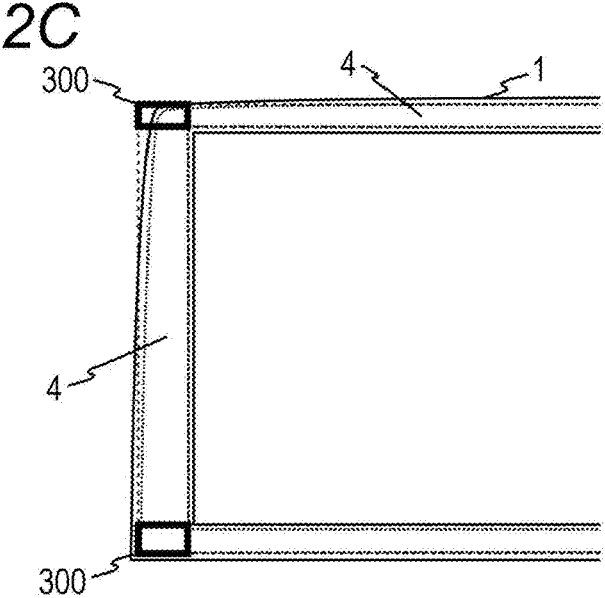
Figure 3A:
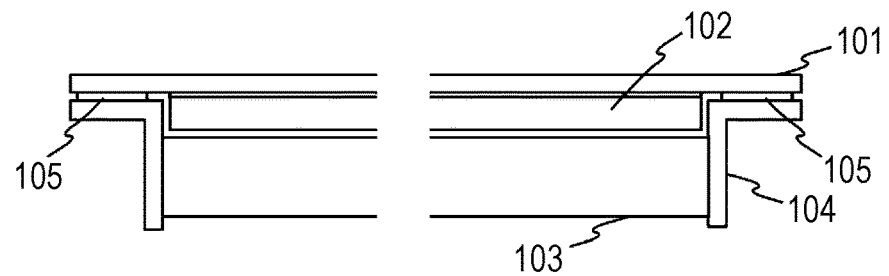
FIGS. 3A to 3C are diagrams illustrating a configuration of a conventional liquid crystal display device.
Figure 3B:
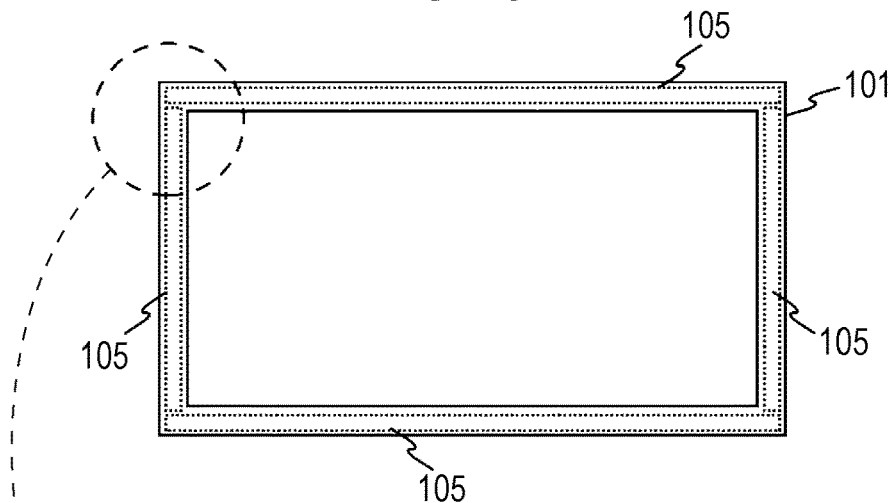
Figure 3C:
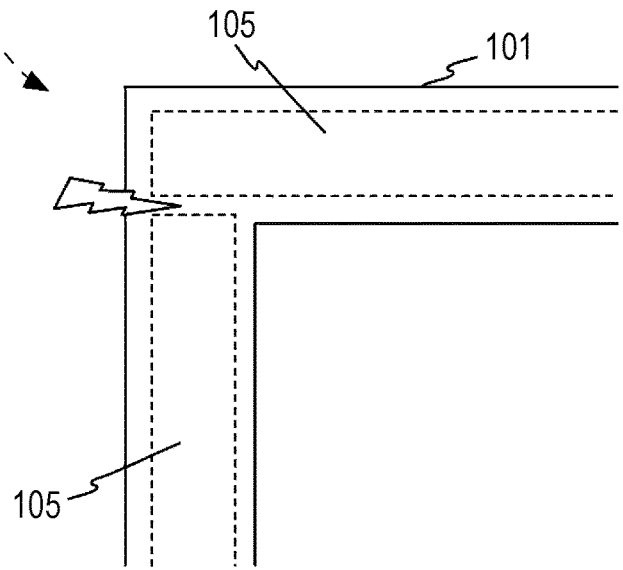

However, in any case, as illustrated in FIG. 2C, it is preferable in reducing the cost of each adhesive double-sided tape 4 that shapes of end portions of adhesive double-sided tapes 4 on two adjacent sides are set such that the narrow path 10 is formed in a gap within a range 300 corresponding to the outer edge portion of the OGS 1, which is a portion that does not overlap the liquid crystal display 2 as viewed in the front-rear direction, on each of the two sides, that is, within the range 300 where a part extending along a first side in the outer edge portion overlaps a part extending along a second side adjacent to the first side in the outer edge portion.

Note that the technology for improving ESD resistance according to the present embodiment can be similarly applied to a case where a cover glass having no touch panel function is provided instead of the OGS 1 or a case where another type of display such as an organic EL display is used instead of the liquid crystal display 2.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display device comprising:
    a display;
    a glass bonded to a front surface of the display such that an outer edge portion of a rear surface thereof is not covered by the display;
    a frame; and
    a plurality of adhesive double-sided tapes configured to bond the outer edge portion of the rear surface of the glass to the frame,
    wherein the plurality of adhesive double-sided tapes includes a first adhesive double-sided tape extending along a first side of the glass, and a second adhesive double-sided tape extending along a second side adjacent to the first side of the glass,
    an end portion of the first adhesive double-sided tape on the second side and an end portion of the second adhesive double-sided tape on the first side are adjacent to each other with a gap therebetween and without contacting one another, and
    the gap is bent at three or more locations while extending narrowly as viewed in a front-rear direction, so that the gap is configured to resist an arc resulting from electrostatic discharge from traversing the gap.

2. The display device according to claim 1,
    wherein a region occupied by the gap is a region within a range where a part extending along the first side in the outer edge portion overlaps a part extending along the second side in the outer edge portion as viewed in the front-rear direction.

3. The display device according to claim 2,
wherein the glass is a one-glass solution (OGS) having a function as a touch panel.

4. The display device according to claim 3, further comprising
a backlight unit fixed to the frame at a position behind the display,
wherein the display is a liquid crystal display.

5. The display device according to claim 1, wherein a width of the gap is less than one millimeter.

6. The display device according to claim 5, wherein the width of the gap is about a few tenths of a millimeter.

7. A display device comprising:
a display;
a glass bonded to a front surface of the display such that an outer edge portion of a rear surface thereof is not covered by the display;
a frame; and
a plurality of adhesive double-sided tapes configured to bond the outer edge portion of the rear surface of the glass to the frame,
wherein the plurality of adhesive double-sided tapes includes a first adhesive double-sided tape extending along a first side of the glass, and a second adhesive double-sided tape extending along a second side adjacent to the first side of the glass,
an end portion of the first adhesive double-sided tape on the second side and an end portion of the second adhesive double-sided tape on the first side are adjacent to each other with a gap therebetween and without contacting one another, and
the gap has sections that advance along the gap in directions opposite to one another from one end to the other end of the gap while extending narrowly as viewed in a front-rear direction, so that the gap is configured to resist an arc resulting from electro-static discharge from traversing the gap.

8. The display device according to claim 7,
wherein a region occupied by the gap is a region within a range where a part extending along the first side in the outer edge portion overlaps a part extending along the second side in the outer edge portion as viewed in the front-rear direction.

9. The display device according to claim 8,
wherein the glass is a one-glass solution (OGS) having a function as a touch panel.

10. The display device according to claim 9, further comprising
a backlight unit fixed to the frame at a position behind the display,
wherein the display is a liquid crystal display.

11. The display device according to claim 7, wherein a width of the gap is less than one millimeter.

12. The display device according to claim 11, wherein the width of the gap is about a few tenths of a millimeter.

13. A display device comprising:
a display;
a glass bonded to a front surface of the display such that an outer edge portion of a rear surface thereof is not covered by the display;
a frame; and
a plurality of adhesive tapes configured to bond the outer edge portion of the rear surface of the glass to the frame,
wherein the plurality of adhesive tapes includes a first adhesive tape extending along a first side of the glass, and a second adhesive tape extending along a second side adjacent to the first side of the glass,
an end portion of the first adhesive tape on the second side and an end portion of the second adhesive tape on the first side are adjacent to each other with a gap therebetween and without contacting one another, and
the gap has a shape that is bent while having a narrow width, so that the gap is configured to resist an arc resulting from electro-static discharge from traversing the gap.

14. The display device according to claim 13,
wherein a region occupied by the gap is a region within a range where a part extending along the first side in the outer edge portion overlaps a part extending along the second side in the outer edge portion as viewed in the front-rear direction.

15. The display device according to claim 14,
wherein the glass is a one-glass solution (OGS) having a function as a touch panel.

16. The display device according to claim 13, further comprising
a backlight unit fixed to the frame at a position behind the display,
wherein the display is a liquid crystal display.

17. The display device according to claim 13, wherein the gap extends in a reciprocating manner from one end to another end of the gap.

18. The display device according to claim 13, wherein the gap extends in a spiral manner from one end to another end of the gap.

19. The display device according to claim 13, wherein the width of the gap is less than one millimeter.

20. The display device according to claim 19, wherein the width of the gap is about a few tenths of a millimeter.

* * * * *